US012808477B2

(12) United States Patent
Stolson et al.

(10) Patent No.: US 12,808,477 B2
(45) Date of Patent: Nov. 24, 2026

(54) VALVE KIT WITH INSERTION VALVE AND CUTTING ASSEMBLY

(71) Applicant: Hydra-Stop LLC, Burr Ridge, IL (US)

(72) Inventors: Andrew J. Stolson, Chicago, IL (US); Cullen J. Geppert, Chicago, IL (US); Ariel Choi, Chicago, IL (US); Nathan Smrha, Brookfield, IL (US)

(73) Assignee: Hydra-Stop LLC, Burr Ridge, IL (US)

( * ) Notice: Subject to any disclaimer, the term of this patent is extended or adjusted under 35 U.S.C. 154(b) by 0 days.

(21) Appl. No.: 19/301,044

(22) Filed: Aug. 15, 2025

(65) Prior Publication Data

US 2025/0369550 A1 Dec. 4, 2025

Related U.S. Application Data

(62) Division of application No. 18/484,115, filed on Oct. 10, 2023, now Pat. No. 12,578,050.

(60) Provisional application No. 63/415,077, filed on Oct. 11, 2022.

(51) Int. Cl.

| | |
|---|---|
| ***F16L 55/105*** | (2006.01) |
| ***F16K 3/02*** | (2006.01) |
| ***F16L 55/10*** | (2006.01) |

(52) U.S. Cl.

CPC .......... *F16L 55/105* (2013.01); *F16K 3/0272* (2013.01); *F16K 3/0281* (2013.01); *F16L 55/1018* (2013.01)

(58) Field of Classification Search

CPC .... F16L 55/105; F16K 3/0281; F16K 3/0272; Y10T 137/7062; Y10T 137/6072; Y10T 137/6075

See application file for complete search history.

(56) References Cited

U.S. PATENT DOCUMENTS

| | | | | |
|---|---|---|---|---|
| 5,620,020 A * | 4/1997 | Collins | F16L 55/105 | 83/745 |
| 6,776,184 B1 * | 8/2004 | Maichel | F16L 55/105 | 251/327 |
| 10,473,560 B2 * | 11/2019 | Nelson | G01N 1/08 | |
| 2013/0220436 A1 * | 8/2013 | Sharp | B23D 21/006 | 137/15.01 |

* cited by examiner

*Primary Examiner* — Michael R Reid

(74) *Attorney, Agent, or Firm* — Husch Blackwell LLP

(57) ABSTRACT

Systems and methods for cutting an existing pipe carrying a fluid under pressure include using a cutting assembly having first and second linear cutters spaced by a lateral width. The cutters are moved from a retracted position to an extended position thereby to cut a coupon from the existing pipe. An insertion valve may then be installed on the existing pipe at the location where the coupon was removed. The insertion valve includes a valve element that is movable between open and closed positions. In some examples, the systems and methods include a check valve that moves from an open position to a closed position as the valve element moves from the closed position to the open position, thereby to facilitate repair and/or replacement of the insertion valve.

9 Claims, 12 Drawing Sheets

VALVE KIT WITH INSERTION VALVE AND CUTTING ASSEMBLY

CROSS-REFERENCE TO RELATED APPLICATION

This application is a divisional of U.S. Non-Provisional patent application Ser. No. 18/484,115, filed on Oct. 10, 2023, which claims the benefit of and priority to U.S. Provisional Application No. 63/415,077, filed Oct. 11, 2022, all the content of both is hereby incorporated by reference in their entirety.

FIELD OF DISCLOSURE

The present disclosure generally relates to insertion valves used to shut off flow in a pressurized pipe or conduit without shutting off flow to the pipe, and related methods of installing insertion valves into a pressurized pipe.

BACKGROUND

Pressurized conduits or pipes convey fluids, both liquid and gas, in municipalities, industrial plants, and commercial installations. When originally installed, a network of pipes may include strategically located isolation valves or block valves, which are used to isolate certain downstream sections of the pipe for repairs, relocation, and installation of new components into the pipe. When a shutdown is required in a municipal water system, a large area may be deprived of water service. In addition to the inconvenience to residents, such shutdowns also may require schools, hospitals, commercial facilities, and/or industrial plants to be shut down until water service is restored.

The length of pipe that needs to be isolated can be shortened and fewer people inconvenienced by adding additional valves in conjunction with the preexisting block valves. The additional valves may be of the form that can be installed in a pressurized pipe without service interruption and with minimal fluid loss. If an additional valve is installed, it may be closed to depressurize a damaged section of the pipe. Upon completion of the work on the depressurized damaged section of the pipe, the additional valve, as well as any block valves, may be opened to restore fluid flow through the repaired section of pipe. The additional valves are known in the art under a variety of names, such as insertion valves, add-on valves, insertable gate valves, etc.

A hot tapping procedure may be used during installation of the insertion valve to minimize service disruption. In a hot tapping procedure, a new access point into the pipe is formed while the fluid inside the pipe remains at an operable pressure. For example, commonly assigned U.S. Pat. Nos. 6,810,903, 8,627,843 and 9,644,779 disclose methods of installing insertion valves in pressurized pipes that do not require service interruption and result in minimal fluid or pressure loss. The insertion valves connect to the pipe as an assembly using a permanent housing known as a valve housing that is sealably clamped, welded, or otherwise sealably joined to the existing pipe, with an open end of the valve housing oriented upward. A temporary gate valve is sealably mounted on the open top of the valve housing. One or more "tap" or installation housings and a tapping machine are mounted on top of the temporary gate valve for delivering a cutting device through the temporary gate valve and the open end of the valve housing to cut a hole or "coupon" in the existing pipe. After removal of the cutting device and closure of the temporary gate valve, the same or similar installation housing is mounted on the temporary gate valve for delivering the insertion valve through the temporary gate valve and to the interior of the valve housing. This procedure is accomplished without depressurizing the pipe.

Conventional insertion valve assemblies and methods typically require a relatively large coupon to be cut from the existing pipe, which increases size and weight of the insertion valve assembly, as well as increasing time needed to cut the coupon. Additionally, as conventional insertion valve assemblies wear and require replacement, fluid pressure in the pipe section carrying the insertion valve must be shut down, interrupting service to end users for an excessive amount of time.

BRIEF SUMMARY OF THE DISCLOSURE

According to certain aspects of the present disclosure, a valve kit is provided for use with an existing pipe containing a fluid under pressure. The valve kit comprises an insertion valve assembly, including an outer valve body defining an outer valve body chamber extending along an outer valve body axis from an outer valve body first end to an outer valve body second end. The outer valve body includes an outer valve body first section, an outer valve body second section, and a pair of outer valve body seals disposed between the outer valve body first section and the outer valve body second section, wherein the outer valve body second section is configured to be coupled to the outer valve body first section and around the existing pipe, with the pair of outer body valve seals compressed to seal between the outer valve body first section and the outer valve body second section on opposite sides of the existing pipe. The outer valve body first section defines an access chamber fluidly communicating between the outer valve body chamber and a support flange. The insertion valve assembly further includes a first gland coupled to the outer valve body first end, a second gland coupled to the outer valve body second end, a first seal disposed between the first gland and the outer valve body first end, the first seal sized to sealingly engage with the existing pipe when compressed between the first gland and the outer valve body first end, and a second seal disposed between the second gland and the outer valve body second end, the second seal sized to sealingly engage with the existing pipe when compressed between the second gland and the outer valve body second end. The insertion valve assembly also includes a bonnet configured to sealingly engage with the support flange of the outer valve body first section, an insertion valve stem operably coupled to the bonnet, and an insertion valve element operably coupled to the insertion valve stem and movable between a closed position, in which the insertion valve element extends entirely across the outer valve body chamber to block fluid flow along the outer valve body axis, and an open position, in which the insertion valve element at least partially unblocks the outer valve body chamber to permit fluid flow along the outer valve body axis. The valve kit further includes an isolation valve comprising an isolation valve housing having an isolation valve housing first end configured to be coupled to the support flange and an isolation valve housing second end, the isolation valve housing defining an isolation valve chamber extending through the isolation valve housing from the isolation valve housing first end to the isolation valve housing second end, and an isolation valve element disposed within the isolation valve housing and movable between a closed position, in which the isolation valve element obstructs the isolation valve chamber, and an open position, in which the isolation valve element unobstructs the isolation valve chamber. The valve kit also includes a cutting assembly comprising a cutting assembly housing defining a cutting assembly chamber extending from a cutting assembly housing open end to a cutting assembly housing closed end, the cutting assembly housing open end being configured to be coupled to the isolation valve housing second end. A drive shaft is coupled to the cutting assembly housing and includes a drive end disposed within the cutting assembly chamber and an actuating end disposed outside of the cutting assembly chamber. A carriage is coupled to the drive shaft and configured to translate along the drive shaft between a retracted position and an extended position. A first linear cutter coupled to and movable with the carriage, and a second linear cutter coupled to and movable with the carriage. The second linear cutter is spaced from the first linear cutter by a lateral width, wherein the carriage, first linear cutter, and second linear cutter define a cutter envelope sized pass through the isolation valve chamber of the isolation valve and the access chamber of the outer valve body. A cutter actuator is operably coupled to the first linear cutter and the second linear cutter. When the carriage is in the retracted position, the first and second linear cutters are disposed within the cutting assembly chamber, and when the carriage is in the extended position, the first and second linear cutters project from the cutting assembly housing open end by a cutting distance sufficient to extend entirely through the existing pipe.

According to other aspects of the present disclosure, a cutting assembly is provided for use with an existing pipe containing a fluid under pressure, the cutting assembly comprising a cutting assembly housing defining a cutting assembly chamber extending from a cutting assembly housing open end to a cutting assembly housing closed end, a drive shaft coupled to the cutting assembly housing, the drive shaft including a drive end disposed within the cutting assembly chamber and an actuating end disposed outside of the cutting assembly chamber, and a carriage coupled to the drive shaft and configured to translate along the drive shaft between a retracted position and an extended position. The cutting assembly further includes a first linear cutter coupled to and movable with the carriage, and a second linear cutter coupled to and movable with the carriage, with the second linear cutter spaced from the first linear cutter by a lateral width. A cutter actuator is operably coupled to the first linear cutter and the second linear cutter. When the carriage is in the retracted position, the first and second linear cutters are disposed within the cutting assembly chamber, and when the carriage is in the extended position, the first and second linear cutters project from the cutting assembly housing open end by a cutting distance sufficient to extend entirely through the existing pipe.

According to further aspects of the present disclosure, a method is provided of cutting an existing pipe containing a fluid under pressure. The method comprises coupling an outer valve body to the existing pipe, the outer valve body defining an outer valve body chamber extending along an outer valve body axis from an outer valve body first end to an outer valve body second end, wherein the outer valve body first section further defines an access chamber fluidly communicating between the outer valve body chamber and a support flange. The method further includes coupling an isolation valve to the support flange of the outer valve body, the isolation valve including an isolation valve element movable between a closed position, in which the isolation valve element obstructs the isolation valve chamber, and an open position, in which the isolation valve element unobstructs the isolation valve chamber. A cutting assembly is coupled to the isolation valve, the cutting assembly comprising a cutting assembly housing defining a cutting assembly chamber, and first and second linear cutters spaced by a lateral distance, wherein the first and second linear cutters are mounted to a carriage translatable between a retracted position, in which the first and second linear cutters are disposed within the cutting assembly chamber, and an extended position, in which the first and second linear cutters project from the cutting assembly housing by a cutting distance sufficient to extend entirely through the existing pipe. The isolation valve element is then placed in the open position and a coupon is cut from the existing pipe by moving the carriage from the retracted position to the extended position so that the first and second linear cutters respectively make first and second linear cuts through the existing pipe. The coupon then is removed from the outer valve body.

According to additional aspects of the present disclosure, an insertion valve assembly is provided for use with an existing pipe containing a fluid under pressure. The insertion valve assembly comprises an outer valve body defining an outer valve body chamber extending along an outer valve body axis from an outer valve body first end to an outer valve body second end, the outer valve body including an outer valve body first section and an outer valve body second section configured to be coupled to the outer valve body first section and around the existing pipe, wherein the outer valve body first section defines an access chamber fluidly communicating between the outer valve body chamber and a support flange. The insertion valve assembly further includes an insertion valve body sized for insertion through the access chamber of the outer valve body first section, the insertion valve body including an attachment portion sealingly coupled to the outer valve body first section and defining an insertion valve access chamber. A bonnet is configured to sealingly engage with the support flange of the outer valve body first section, and an insertion valve stem is operably coupled to the bonnet. An insertion valve element is operably coupled to the insertion valve stem and is movable between a closed position, in which the insertion valve element extends entirely across the outer valve body chamber to block fluid flow along the outer valve body axis, and an open position, in which the insertion valve element at least partially unblocks the outer valve body chamber to permit fluid flow along the outer valve body axis. A check valve extends across the insertion valve access chamber and is configured to have an open position when the insertion valve element is in the closed position, and to move to a closed position blocking the insertion valve access chamber when the insertion valve element moves from the closed position to the open position.

The features, functions, and advantages that have been discussed can be achieved independently in various embodiments or may be combined in yet other embodiments further details of which can be seen with reference to the following description and drawings.

Figure 1:
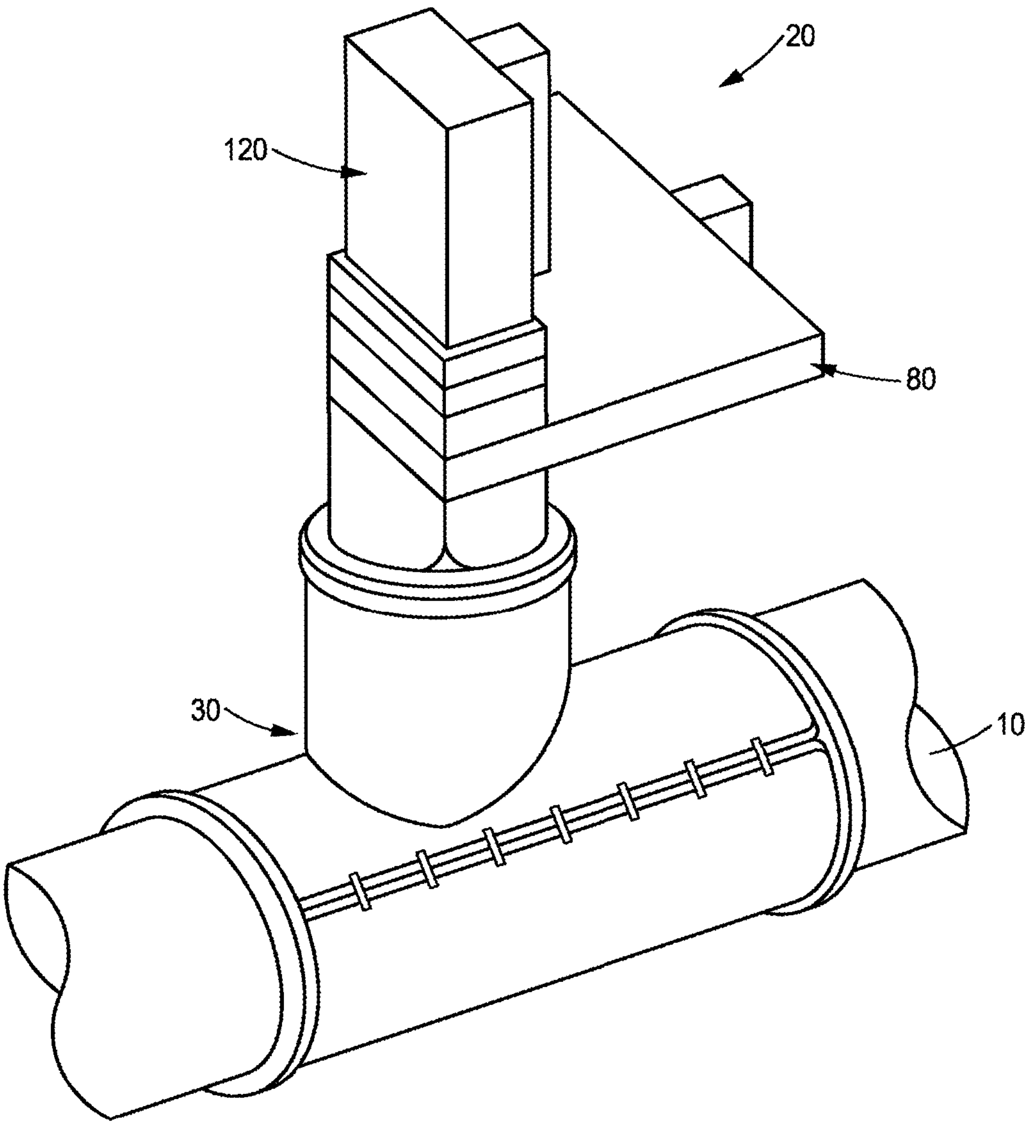
FIG. 1 is a perspective view of a valve kit for use with an existing pipe containing a fluid under pressure, according to the present disclosure.

It should be understood that the drawings are not necessarily drawn to scale and that the disclosed embodiments are sometimes illustrated schematically. It is to be further appreciated that the following detailed description is merely exemplary in nature and is not intended to limit the invention or the application and uses thereof. Hence, although the present disclosure is, for convenience of explanation, depicted and described as certain illustrative embodiments, it will be appreciated that it can be implemented in various other types of embodiments and in various other systems and environments.

DETAILED DESCRIPTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

This disclosure relates to insertion valves used to shut off flow in a pressurized pipe or conduit without shutting off flow to the pipe, and related methods of installing insertion valves into a pressurized pipe. In some embodiments, the systems and methods generally involve providing linear cutters to remove a section of the existing pipe before installing an insertion valve assembly into the existing pipe. Making two, spaced, linear cuts through the existing pipe allows reducing the size of the existing pipe section that is removed, known as the "coupon," when compared to conventional methods that use a single, cylindrical cutter. This, in turn, reduces the size of the insertion valve body to be installed on the existing pipe. In additional embodiments, the systems and methods generally involve providing a check valve that prevents pressurized fluid from escaping when an insertion valve element of an insertion valve assembly is withdrawn from the existing pipe, thereby facilitating maintenance and/or replacement of insertion valve assembly components. Each of the systems and methods disclosed herein may be deployed during a hot tapping process, allowing the existing pipe to be maintained at operating pressure, thereby avoiding or minimizing interruption of service to end users.

FIGS. 1-11 illustrate a valve kit 20 for use with an existing pipe 10 containing a fluid 12 under pressure. The valve kit 20 generally includes an insertion valve assembly 30, an isolation valve 80, and a cutting assembly 120. The isolation valve 80 allows the methods and apparatus described herein to be executed and installed in a hot tapping process. As described in greater detail below, the cutting assembly 120 executes linear cuts through the existing pipe 10. Additionally, as also described in greater detail below, the insertion valve assembly 30 facilitates maintenance and/or replacement of components without interrupting service.

As best shown in FIGS. 2-5, the insertion valve assembly 30 includes an outer valve body 32 that is coupled to and surrounds a section of the existing pipe 10. The outer valve body 32 defines an outer valve body chamber 34 extending along an outer valve body axis 36 from an outer valve body first end 38 to an outer valve body second end 40. The outer valve body 32 is provided in sections, namely an outer valve body first section 42 and an outer valve body second section 44, that are joined together around the existing pipe 10. A pair of outer valve body seals 45 are disposed between the outer valve body first section 42 and the outer valve body second section 44. The outer valve body second section 44 is configured to be coupled to the outer valve body first section 42 and around the existing pipe 10, with the pair of outer body valve seals 45 compressed to seal between the outer valve body first section 42 and the outer valve body second section 44 on opposite sides of the existing pipe 10. The outer valve body first section 42 further defines an access chamber 46 fluidly communicating between the outer valve body chamber 34 and a support flange 48, to permit access to the section of pipe 10 enclosed by the outer valve body 32.

Figure 2:
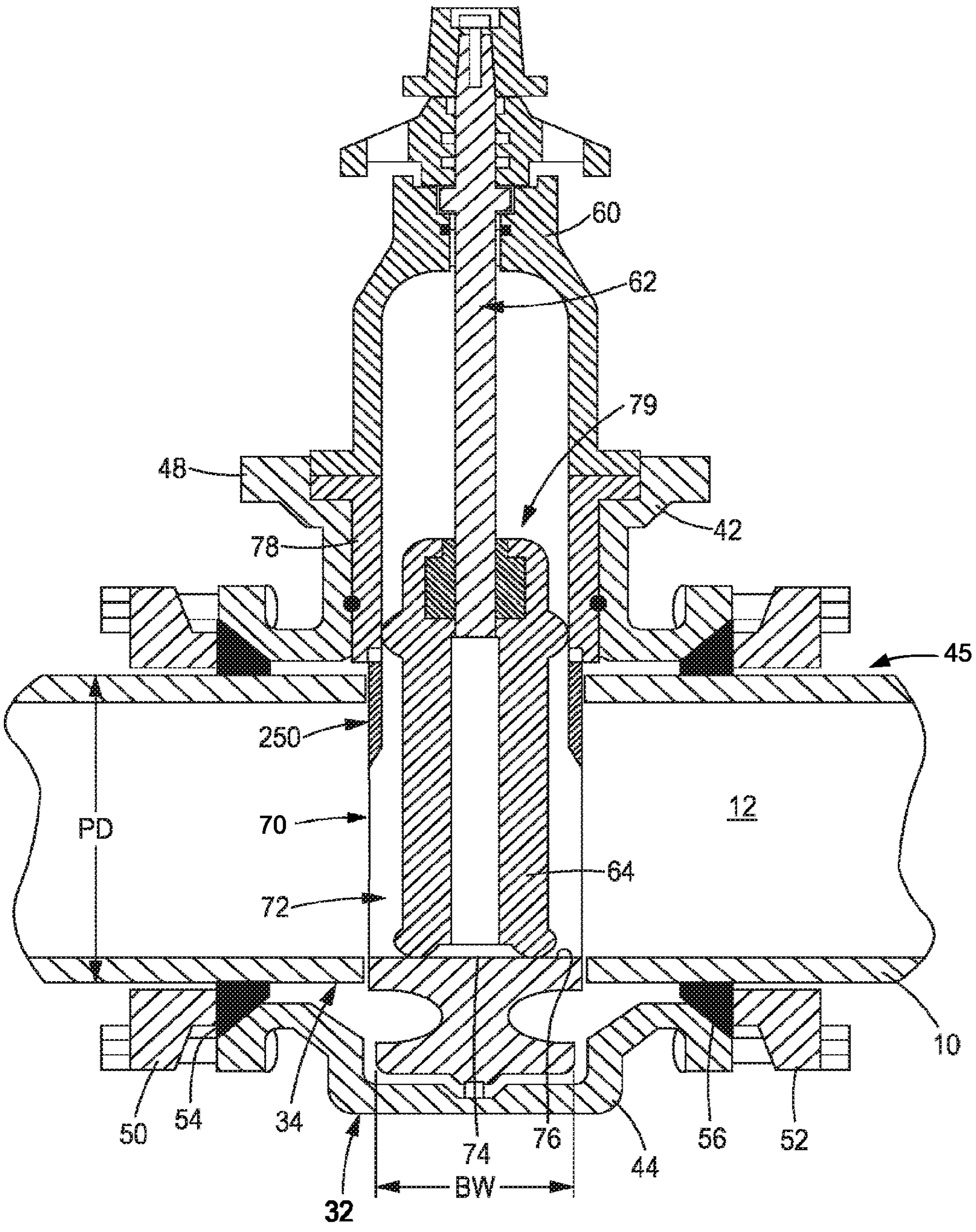
FIG. 2 is a side elevation view, in cross section, of an insertion valve assembly of the valve kit of FIG. 1 installed on the existing pipe, with an insertion valve element of the insertion valve assembly in a closed position.
Figure 3:
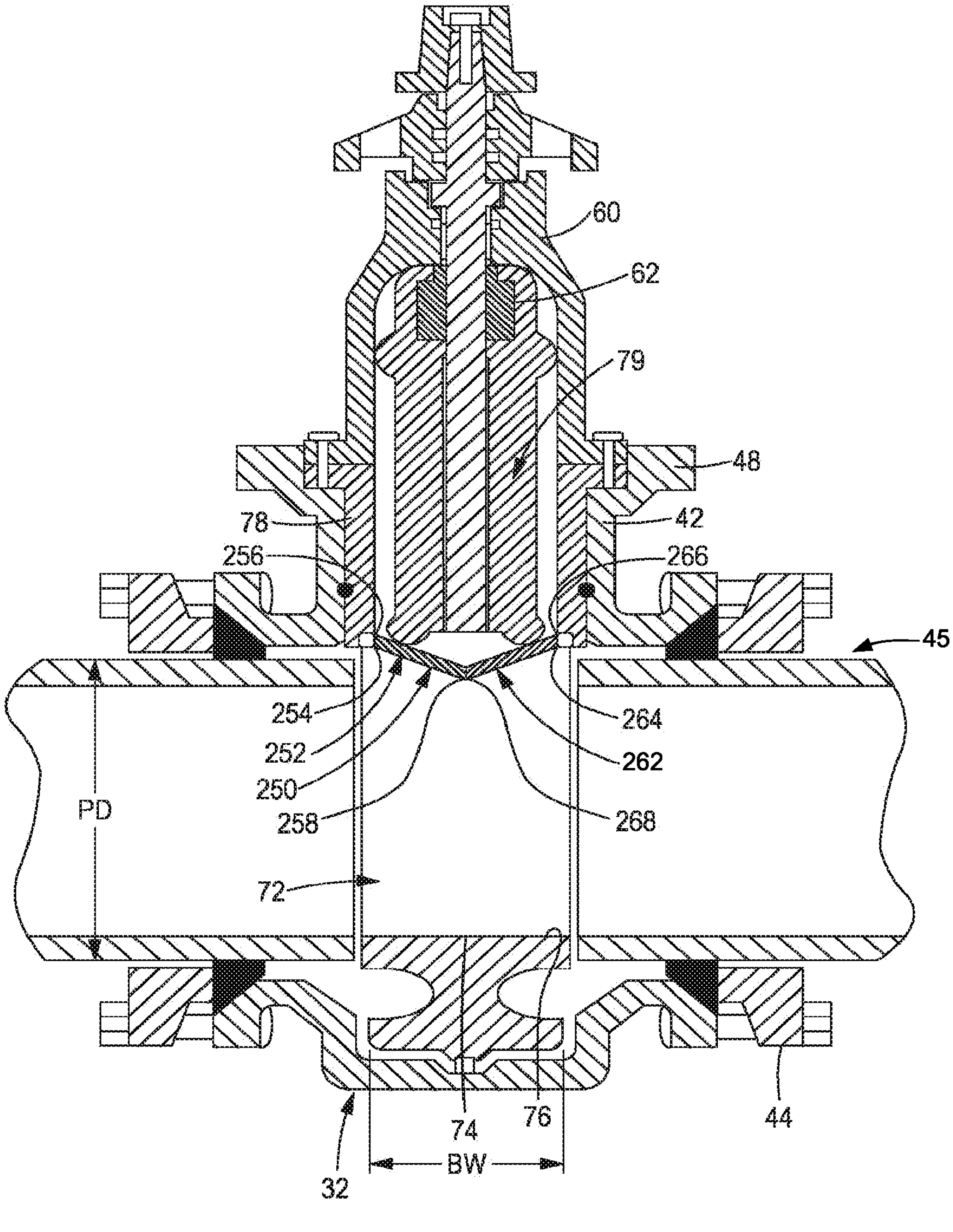
FIG. 3 is a side elevation view, in cross section, of the insertion valve assembly of FIG. 2 installed on the existing pipe, with the insertion valve element in an open position
Figure 4:
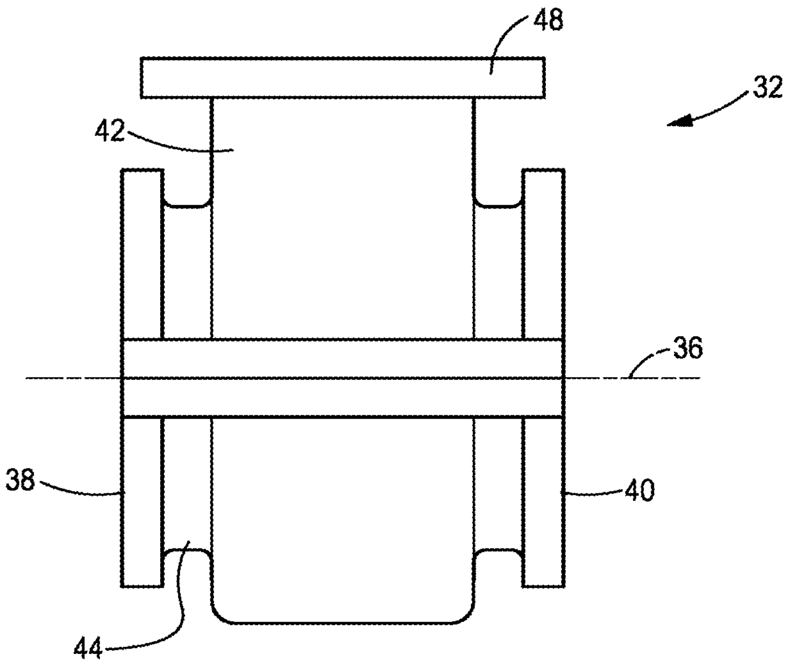
FIG. 4 is an enlarged side elevation view of an outer valve body of the insertion valve assembly of FIG. 2.
Figure 5:
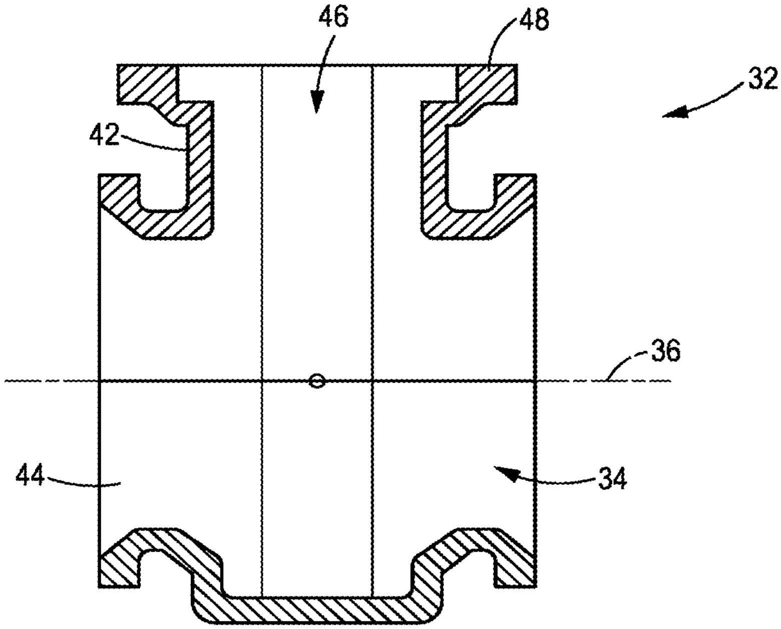
FIG. 5 is a side elevation view, in cross-section, of the outer valve body of FIG. 4.

Additionally, the ends of the outer valve body 32 are sealed to the existing pipe 10 to prevent leaks. As best shown in FIGS. 2 and 3, a first gland 50 is coupled to the outer valve body first end 38, and a second gland 52 coupled to the outer valve body second end 40. A first seal 54 is disposed between the first gland 50 and the outer valve body first end 38, and the first seal 54 sized to sealingly engage with the existing pipe 10 when compressed between the first gland 50 and the outer valve body first end 38. Similarly, a second seal 56 is disposed between the second gland 52 and the outer valve body second end 40, and the second seal 56 sized to sealingly engage with the existing pipe 10 when compressed between the second gland 52 and the outer valve body second end 40.

The insertion valve assembly 30 further includes components for closing off the access chamber 46 of the outer housing 32 and selectively stopping fluid flow through the existing pipe 10. More specifically, as best shown in FIGS. 2 and 3, the insertion valve assembly 30 includes a bonnet 60 configured to sealingly engage with the support flange 48 of the outer valve body first section 42. An insertion valve stem 62 is coupled to the bonnet 60, and an insertion valve element 64 is operably coupled to the insertion valve stem 62. The insertion valve element 64 is movable, via movement of the insertion valve stem 62, between a closed position, in which the insertion valve element 64 extends entirely across the outer valve body chamber 34 to block fluid flow along the outer valve body axis 36, and an open position, in which the insertion valve element 64 at least partially unblocks the outer valve body chamber 34 to permit fluid flow along the outer valve body axis 36. In some examples, the insertion valve element 64 comprises a gate valve element.

In some embodiments, the insertion valve assembly 30 is configured so that the insertion valve element 64 engages with a seat that is formed by a component that is inserted through the existing pipe 10. More specifically, as best shown in FIGS. 2 and 3, the insertion valve assembly further includes an insertion valve body 70 sized for insertion through the access chamber 46 of the outer valve body first section 42. The insertion valve body 70 includes a valve guide portion 72 that extends across the outer valve body chamber 34. The valve guide portion 72 includes a valve seat 74 defining a flow orifice 76 that extends through the valve guide portion 72. The valve seat 74 is configured to sealingly engage with the insertion valve element 64 when the insertion valve element 64 is in the closed position. The insertion valve body 70 further includes an attachment portion 78 that is sealingly coupled to the outer valve body first section 42.

Figure 13:
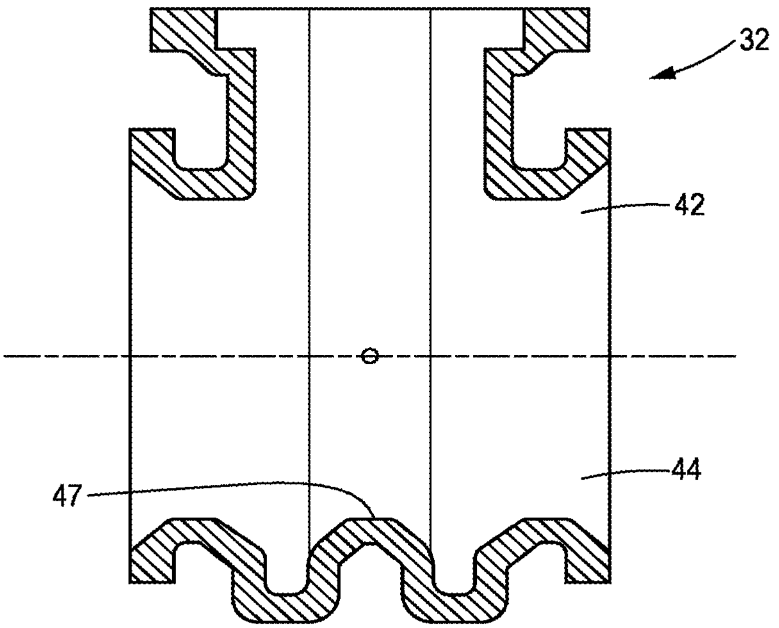
FIG. 13 is a side elevation view, in cross-section, of an alternative embodiment of an outer valve body for use in the insertion valve assembly of FIG. 2.

In other embodiments, the insertion valve assembly 30 is configured so that the insertion valve element 64 engages the outer valve body 32. In these alternative embodiments, it may be advantageous to provide a defined area of the outer valve body 32 to seal with the insertion valve element 64. As best shown in FIG. 13, for example, the outer valve body second section 44 may be formed with a raised seat portion 47, and the insertion valve element 64 may be configured to sealingly engage with the raised seat portion 47 when the insertion valve element 64 is in the closed position. This arrangement advantageously directs debris entrained in the fluid 12 to collect in the relatively lower sections of the outer valve body second section 44 surrounding the raised seat portion 47, thereby reducing instances where such debris may interfere with the seal formed between the insertion valve element 64 and the outer valve body second section 44.

Figure 6:
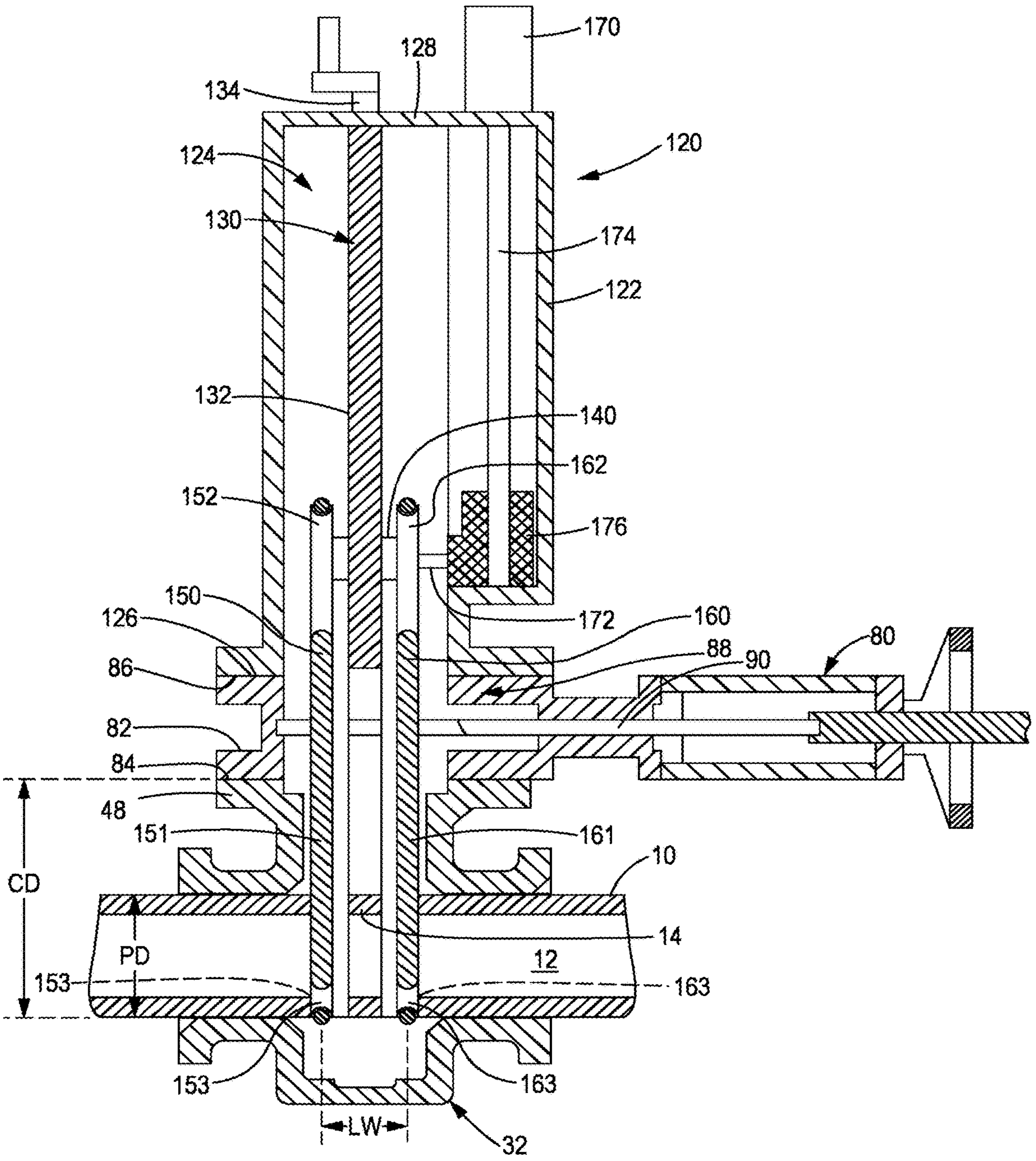
FIG. 6 is a side elevation view, in cross-section, of a cutting assembly of the valve kit of FIG. 1 installed on the existing pipe, with cutters of the cutting assembly in an extended position.
Figure 7:
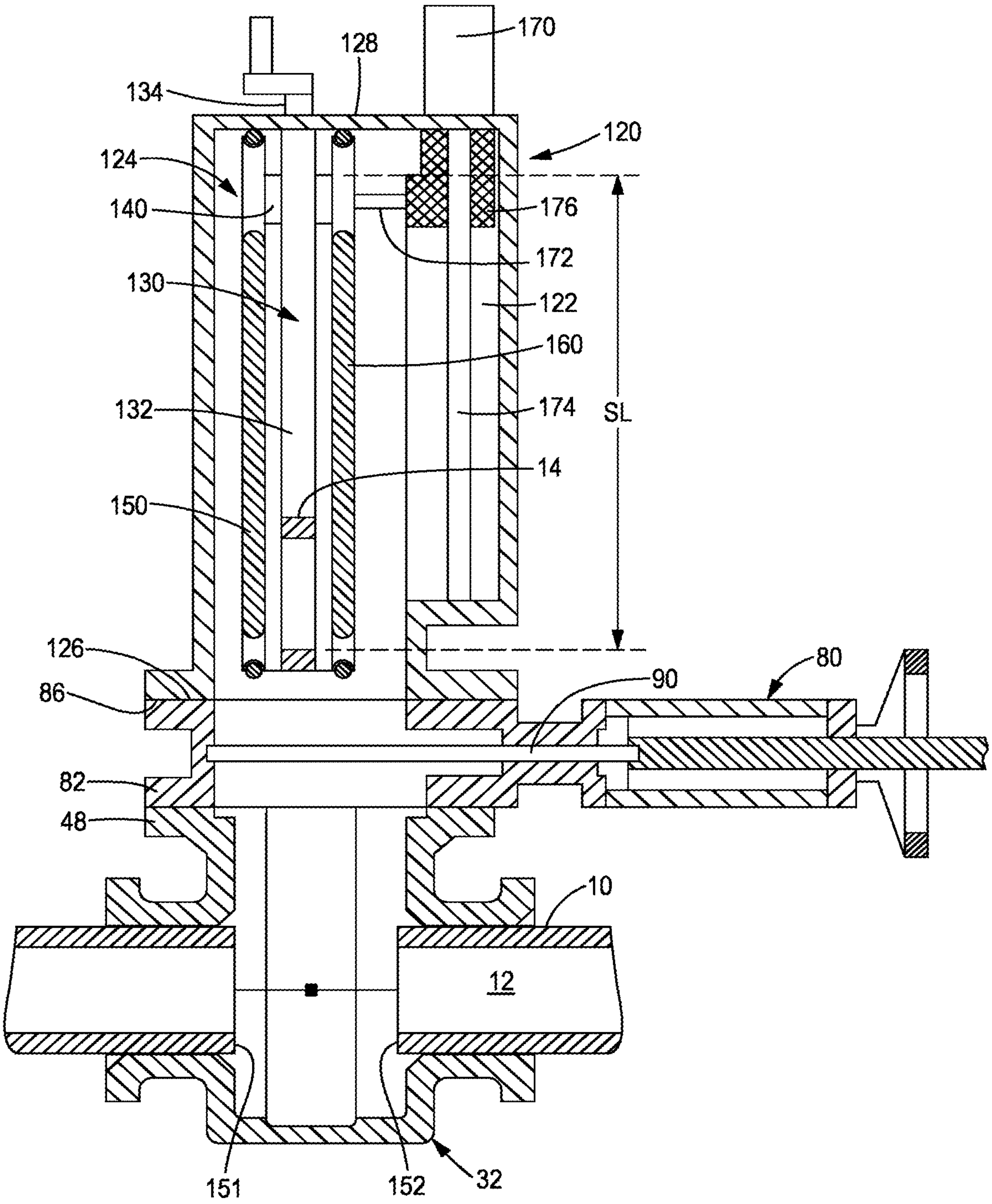
FIG. 7 is a side elevation view, in cross-section, of the cutting assembly of FIG. 6 installed on the existing pipe, with the cutters in a retracted position.
Figure 8:
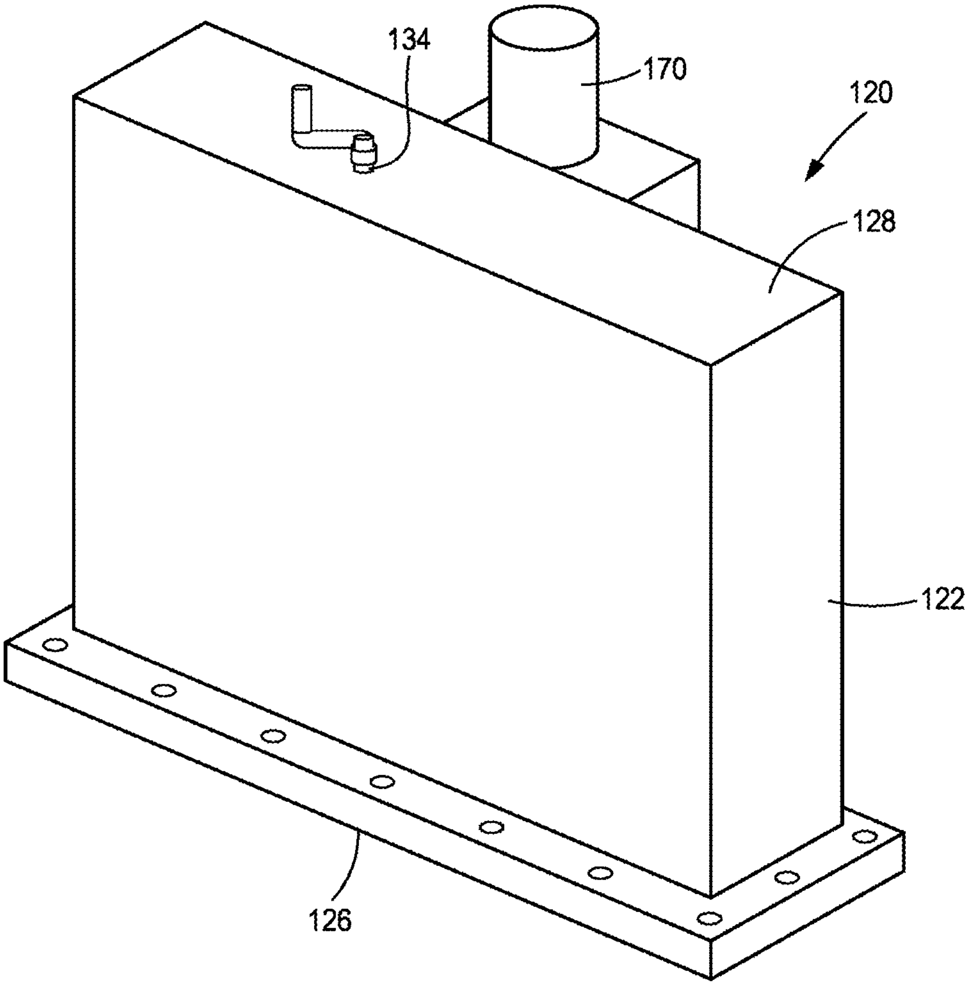
FIG. 8 is a perspective view of the cutting assembly of FIG. 6.

FIGS. 1, 6, and 7 show an exemplary embodiment of the isolation valve 80 of the valve kit 20. The illustrated isolation valve 80 includes an isolation valve housing 82 having an isolation valve housing first end 84 that is configured to be coupled to the support flange 48. An isolation valve housing second end 86 is opposite the isolation valve first end, and the isolation valve housing 82 defines an isolation valve chamber 88 extending through the isolation valve housing 82 from the isolation valve housing first end 84 to the isolation valve housing second end 86. The isolation valve 80 further includes an isolation valve element 90 that is disposed within the isolation valve housing 82 and is movable between a closed position, in which the isolation valve element 90 obstructs the isolation valve chamber 88, and an open position, in which the isolation valve element 90 unobstructs the isolation valve chamber 88.

The cutting assembly 120 of the valve kit 20, best illustrated at FIGS. 1 and 6-11, is configured to execute two linear cuts through the existing pipe 10. In the illustrated example, the cutting assembly 120 includes a cutting assembly housing 122, which defines a cutting assembly chamber 124 extending from a cutting assembly housing open end 126 to a cutting assembly housing closed end 128. The cutting assembly housing open end 126 is configured to be coupled to the isolation valve housing second end 86. A drive shaft 130 is coupled to the cutting assembly housing 122 and includes a drive end 132 disposed within the cutting assembly chamber 124 and an actuating end 134 disposed outside of the cutting assembly chamber 124. A carriage 140 is coupled to the drive shaft 130 and configured to translate along the drive shaft 130 between a retracted position and an extended position. For example, the drive shaft 130 may be a threaded shaft and the carriage 140 may threadably engage the drive shaft 130, so that rotation of the drive shaft 130 causes the carriage 140 to move up or down along the drive shaft 130.

Figure 11:
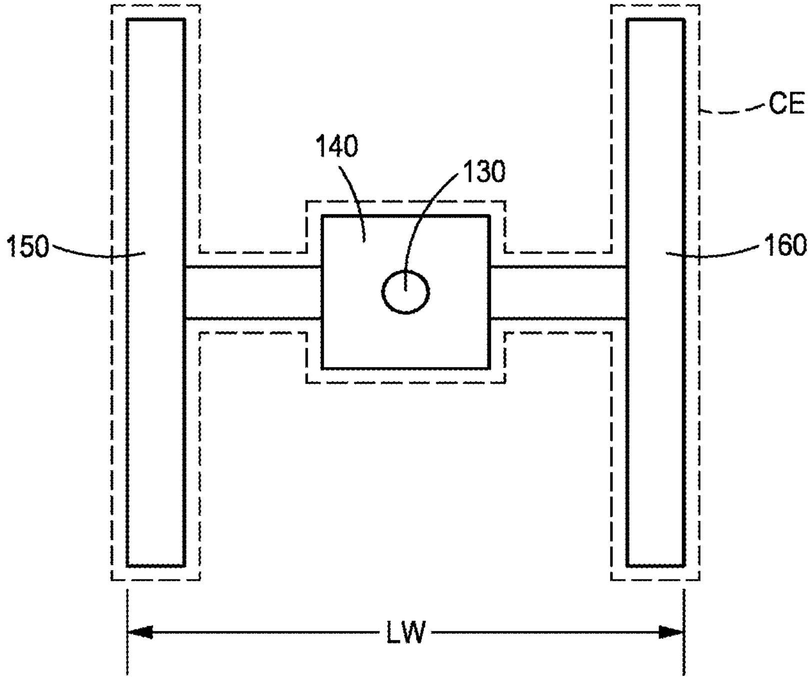
FIG. 11 is an enlarged bottom detail view of the cutting assembly of FIG. 6.

The cutting assembly 120 further includes linear cutters configured to cut through the existing pipe 10. More specifically, a first linear cutter 150 and a second linear cutter 160 are coupled to and movable with the carriage 140. The second linear cutter 160 is spaced from the first linear cutter 150 by a lateral width LW. As best shown in FIG. 11, when viewed from the open end 126 of the cutting assembly housing 122, the carriage 140, first linear cutter 150, and second linear cutter 160 define a cutter envelope CE. The cutter envelope is the spatial footprint that the carriage 140, first linear cutter 150, and second linear cutter 160 occupy as those components travel between the extended and retracted positions of the carriage 140. In the illustrated example, the cutter envelope CE is sized to pass through the isolation valve chamber 88 of the isolation valve 80 and the access chamber 46 of the outer valve body 32. A cutter actuator 170 is operably coupled to the first and second linear cutters 150, 160, to drive the cutters during a cutting operation.

Figure 9:
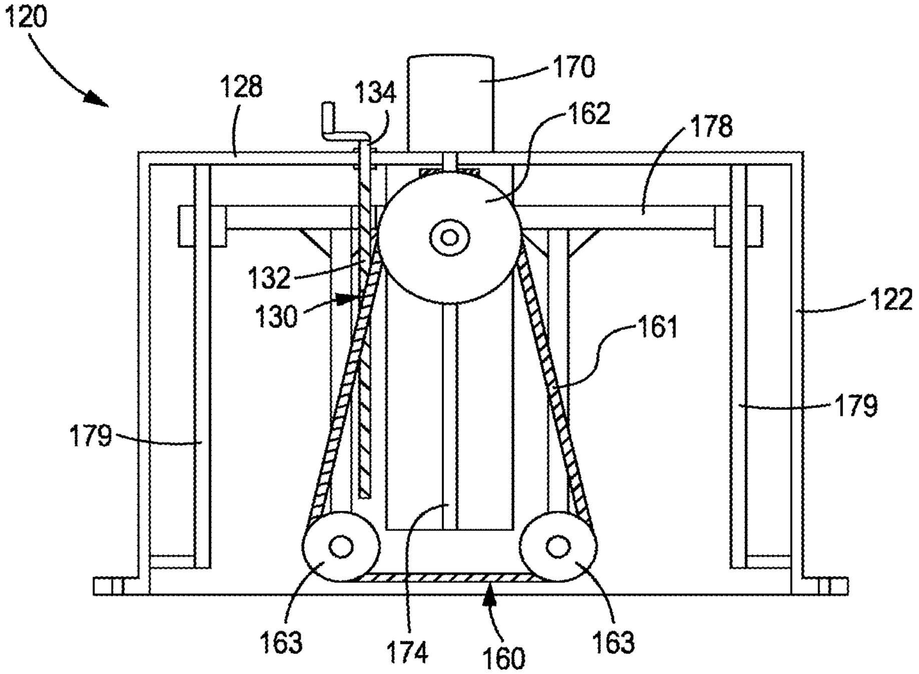
FIG. 9 is an end view, in cross-section, of the cutting assembly of FIG. 6.

In some examples, the first and second linear cutters 150, 160 are provided as diamond wire pipe saws. As best shown in FIGS. 6, 7, and 9, the first linear cutter 150 includes a diamond cutting wire 151 entrained around a drive pulley 152 and two idler pulleys 153. Similarly, the second linear cutter 160 includes a diamond cutting wire 161 entrained around a drive pulley 162 and two idler pulleys 163. The drive pulleys 152, 162 are coupled to and rotate with a spindle 172. The spindle 172 is journally supported by the carriage 140. The spindle 172 is rotatably coupled to a rotating actuator shaft 174 coupled to the actuator 170, such as by a 90 degree gearbox 176. Accordingly, operation of the cutter actuator 170 rotates the actuator shaft 174, which in turn rotates the spindle 172 and attached drive pulleys 152, 162. Rotation of the drive pulleys 152, 162 drive the cutting wires 151, 161 with sufficient speed to cut through the existing pipe 10. A stabilizer frame 178 movable along guide rails 179 may be provided to support the carriage 140, first linear cutter 150, and second linear cutter 160 as they travel between retracted and extended positions. While FIGS. 6, 7, and 9 illustrate the specifics of an embodiment using diamond wire pipe saws, it will be appreciated that the first and second linear cutters 150, 160 may be provided in other forms that execute straight or linear cuts through the existing pipe 10, including but not limited to, chain saws.

Figure 10:
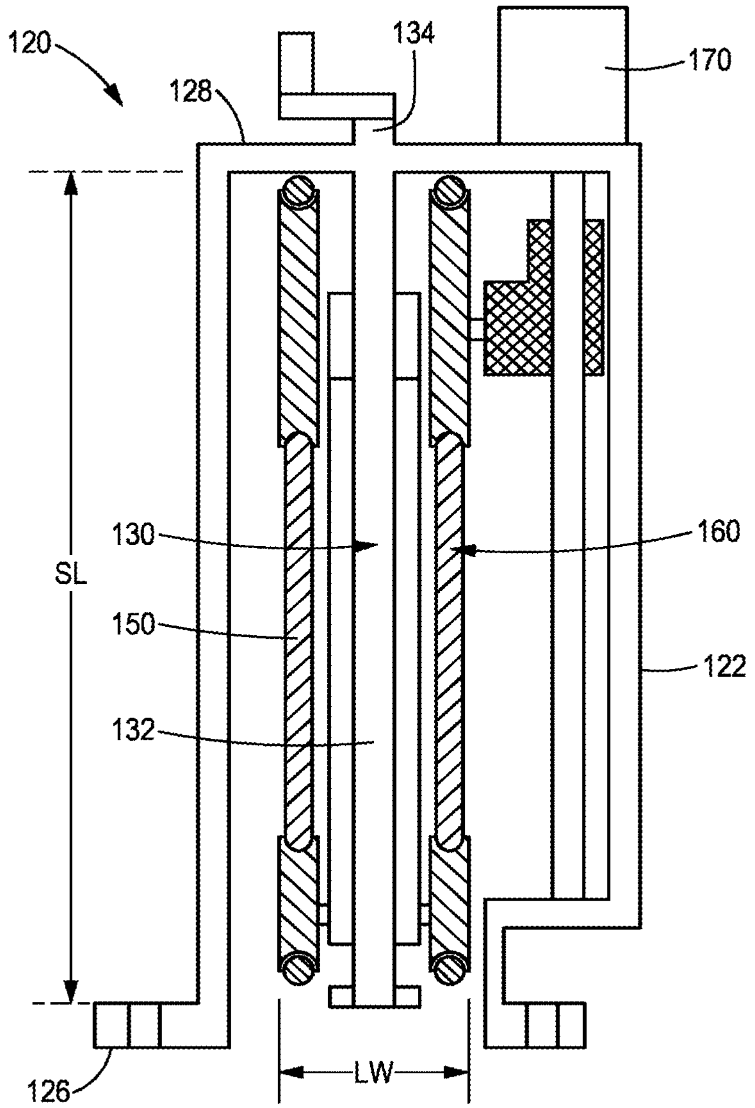
FIG. 10 a side elevation view, in cross-section, of the cutting assembly of FIG. 6, with the cutters in a retracted position.

The cutting assembly 120 is configured to extend the first and second linear cutters 150, 160 a distance sufficiently past the cutting assembly housing open end 126 so that the cutters 150, 160 execute linear cuts entirely through the existing pipe 10. More specifically, as best shown in FIGS. 6 and 10, the drive shaft 130 has a drive shaft length SL such that the cutting distance CD by which the first and second linear cutters 150, 160 project from the cutting assembly housing open end 126 is sufficient for the first and second linear cutters 150, 160 to pass through the isolation valve chamber 88 of the isolation valve 80 and the access chamber 46 of the outer valve body 32, in addition to extending entirely through the existing pipe 10. When the carriage 140 is in the retracted position shown in FIGS. 7 and 10, the first and second linear cutters 150, 160 are disposed within the cutting assembly chamber 124. When the carriage 140 is in the extended position shown in FIG. 6, the first and second linear cutters 150, 160 project from the cutting assembly housing open end 126 by a cutting distance CD sufficient to extend entirely through the existing pipe 10, thereby to separate a section known as the coupon 14 from the existing pipe 10. During or subsequent to return of the carriage 140 from the extended position to the retracted position, the coupon 14 is removed from between the remaining sections of existing pipe 10.

The insertion valve assembly 30 may be sized relative to the cutting assembly 120 to facilitate installation of the insertion valve assembly 30 into the existing pipe 10. More specifically, the insertion valve body 70 may have an insertion valve body width BW (best shown in FIGS. 2 and 3) that is less than the lateral width LW (best shown in FIGS. 6, 10, and 11) between the first linear cutter 150 and the second linear cutter 160.

Furthermore, the cutting assembly 120 may be sized relative to the existing pipe 10 to minimize the amount of pipe that is removed. As best shown in FIG. 6, the existing pipe 10 has a pipe diameter PD. The first and second linear cutters 150, 160 may be spaced such that the lateral width LW therebetween is less than the pipe diameter PD. By spacing the first and second linear cutters 150, 160 in this manner, the coupon 14 that is cut from the existing pipe 10 may be relatively smaller than that removed by conventional, cylindrical cutters, and the coupon 14 itself will have a generally cylindrical shape and a reduced length, thereby permitting the use of smaller components in the insertion valve assembly 30.

In some examples, the insertion valve assembly 30 may include a check valve 250 to facilitate maintenance and/or replacement of components. The check valve 250 extends across the insertion valve access chamber 79 and is generally configured to have an open position when the insertion valve element 64 is in the closed position (FIG. 2), and to move to a closed position blocking the insertion valve access chamber 79 when the insertion valve element 64 moves from the closed position to the open position (FIG. 3).

Figure 12:
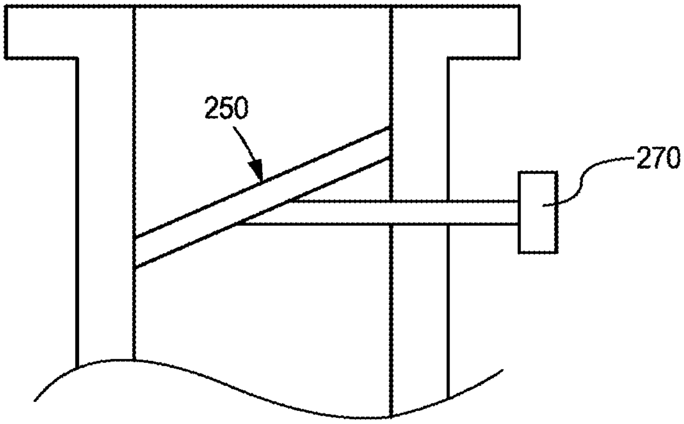
FIG. 12 is a side elevation view, in cross-section, of a detail of the insertion valve assembly showing an alternative embodiment of a check valve.

In the example illustrated in FIGS. 2 and 3, the check valve 250 includes check valve first section 252 having a first end 254 pivotably coupled to a first location 256 of the attachment portion 78 of the insertion valve body 70, and a second end 258. Additionally, the check valve 250 includes a check valve second section 262 having a first end 264 pivotably coupled to a second location 266 of the attachment portion 78 of the insertion valve body 70, and a second end 268. The check valve first sections 252 and the check valve second sections 262 are biased toward closed positions, in which the second end 258 of the check valve first section 252 sealingly engages the second end 268 of the check valve second section 262. Furthermore, the check valve first section 252 and the check valve second section 262 pivot toward open positions upon application of mechanical force. For example, the check valve first and second sections 252, 262 of the check valve 250 may be biased toward the closed positions, and mechanical engagement of the insertion valve element 64 as it moves to the closed position pushes the first and second sections 252, 262 of the check valve 250 to the open positions. Furthermore, removal of mechanical engagement of the insertion valve element 64 from the first and second sections 252, 262 of the check valve 250, such as when the insertion valve element 64 moves to the open position, automatically moves the first and second sections 252, 262 of the check valve 250 to the closed positions. Additionally or alternatively, the check valve 250 may be operated between open and closed positions using a check valve actuator 270, as shown in FIG. 12. The check valve actuator 270 may be operated by any known means, including manually, hydraulically, and pneumatically.

Figure 14:
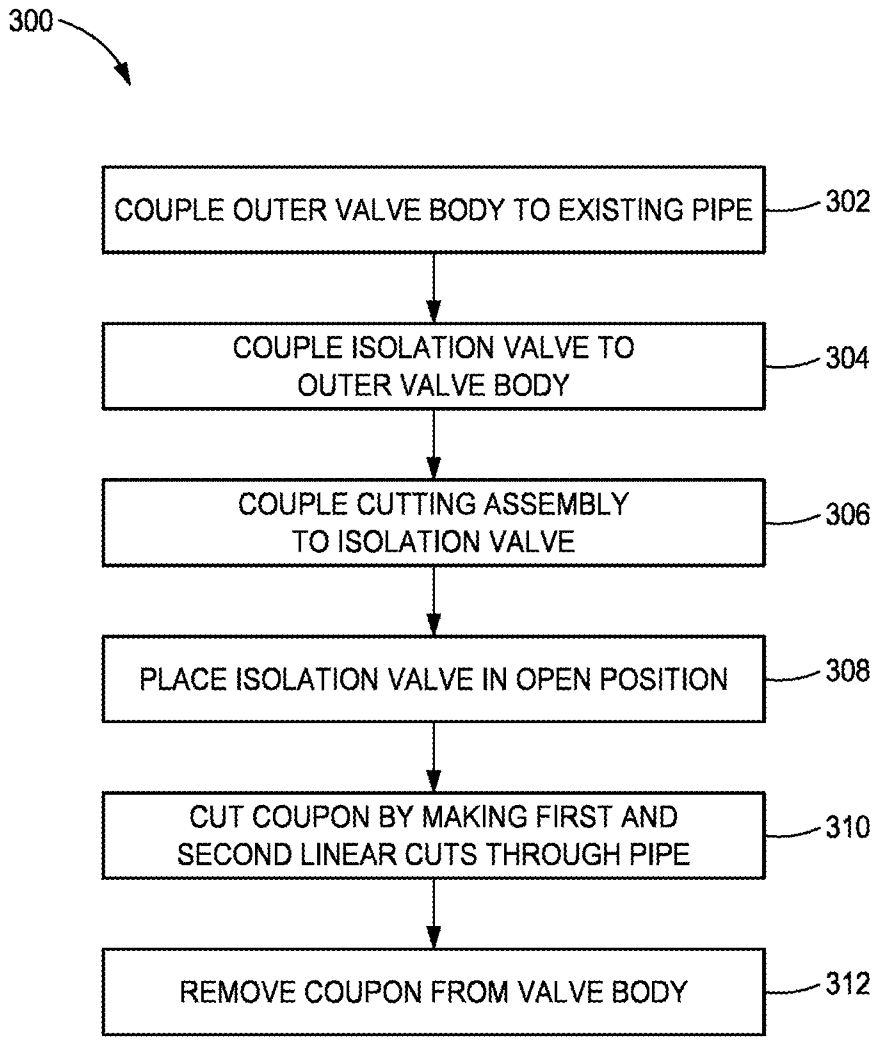
FIG. 14 is a block diagram of a method of cutting an existing pipe containing a fluid under pressure.

According to additional aspects of the present disclosure, a method 300 of cutting an existing pipe 10 containing a fluid 12 under pressure is provided, as schematically illustrated in FIG. 14. The method 300 includes, at block 302, coupling the outer valve body 32 to the existing pipe 10. In this exemplary method 300, the outer valve body 32 defines the outer valve body chamber 34 extending along the outer valve body axis 36 from the outer valve body first end 38 to the outer valve body second end 40, wherein the outer valve body first section 32 further defines the access chamber 46 that fluidly communicates between the outer valve body chamber 34 and the support flange 48.

The method 300 further includes, at block 304, coupling the isolation valve 80 to the support flange 48 of the outer valve body 32. In this exemplary method 300, the isolation valve includes the isolation valve element 90 that is movable between the closed position, in which the isolation valve element 90 obstructs the isolation valve chamber 88, and the open position, in which the isolation valve element 90 unobstructs the isolation valve chamber 88.

At block 306, the method 300 includes coupling the cutting assembly 120 to the isolation valve 80. In this exemplary method, the cutting assembly 120 includes the cutting assembly housing 122 defining the cutting assembly chamber 124, and first and second linear cutters 150, 160 spaced by the lateral distance LW. The first and second linear cutters 150, 160 are mounted to the carriage 140, which is translatable between the retracted position, in which the first and second linear cutters 150, 160 are disposed within the cutting assembly chamber 124, and the extended position, in which the first and second linear cutters 150, 160 project from the cutting assembly housing 122 by the cutting distance CD, which is sufficient to extend entirely through the existing pipe 10.

The method 300 continues at block 308 by placing the isolation valve element 90 in the open position, and at block 310 by cutting a coupon 14 from the existing pipe 10 by moving the carriage 140 from the retracted position to the extended position, so that the first and second linear cutters 150, 160 respectively make first and second linear cuts 151, 161 (FIG. 7) through the existing pipe 10. The method 300 further includes, at block 312, removing the coupon 14 from the outer valve body 32.

All references, including publications, patent applications, and patents, cited herein are hereby incorporated by reference. All methods described herein can be performed in any suitable order unless otherwise indicated herein or otherwise clearly contradicted by context. The use of any and all examples, or exemplary language (e.g., "such as") provided herein, is intended to illuminate the disclosed subject matter and does not pose a limitation on the scope of the claims. Any statement herein as to the nature or benefits of the exemplary embodiments is not intended to be limiting, and the appended claims should not be deemed to be limited by such statements. More generally, no language in the specification should be construed as indicating any non-claimed element as being essential to the practice of the claimed subject matter. The scope of the claims includes all modifications and equivalents of the subject matter recited therein as permitted by applicable law. Moreover, any combination of the above-described elements in all possible variations thereof is encompassed by the claims unless otherwise indicated herein or otherwise clearly contradicted by context. Additionally, aspects of the different embodiments can be combined with or substituted for one another. Finally, the description herein of any reference or patent, even if identified as "prior," is not intended to constitute a concession that such reference or patent is available as prior art against the present disclosure.

The invention claimed is:

1. A valve kit for use with an existing pipe containing a fluid under pressure, the valve kit comprising:

an insertion valve assembly, comprising:

an outer valve body defining an outer valve body chamber extending along an outer valve body axis from an outer valve body first end to an outer valve body second end, the outer valve body including:

an outer valve body first section;

an outer valve body second section;

a pair of outer valve body seals disposed between the outer valve body first section and the outer valve body second section;

wherein the outer valve body second section is configured to be coupled to the outer valve body first section and around the existing pipe, with the pair of outer body valve seals compressed to seal between the outer valve body first section and the outer valve body second section on opposite sides of the existing pipe; and wherein the outer valve body first section defines an access chamber fluidly communicating between the outer valve body chamber and a support flange;

a first gland coupled to the outer valve body first end;

a second gland coupled to the outer valve body second end;

a first seal disposed between the first gland and the outer valve body first end, the first seal sized to sealingly engage with the existing pipe when compressed between the first gland and the outer valve body first end; and a second seal disposed between the second gland and the outer valve body second end, the second seal sized to sealingly engage with the existing pipe when compressed between the second gland and the outer valve body second end;

a bonnet configured to sealingly engage with the support flange of the outer valve body first section;

an insertion valve stem operably coupled to the bonnet; and an insertion valve element operably coupled to the insertion valve stem and movable between a closed position, in which the insertion valve element extends entirely across the outer valve body chamber to block fluid flow along the outer valve body axis, and an open position, in which the insertion valve element at least partially unblocks the outer valve body chamber to permit fluid flow along the outer valve body axis;

an isolation valve comprising:

an isolation valve housing having an isolation valve housing first end configured to be coupled to the support flange and an isolation valve housing second end, the isolation valve housing defining an isolation valve chamber extending through the isolation valve housing from the isolation valve housing first end to the isolation valve housing second end; and an isolation valve element disposed within the isolation valve housing and movable between a closed position, in which the isolation valve element obstructs the isolation valve chamber, and an open position, in which the isolation valve element unobstructs the isolation valve chamber; and a cutting assembly, comprising:

a cutting assembly housing defining a cutting assembly chamber extending from a cutting assembly housing open end to a cutting assembly housing closed end, the cutting assembly housing open end being configured to be coupled to the isolation valve housing second end;

a drive shaft coupled to the cutting assembly housing, the drive shaft including a drive end disposed within the cutting assembly chamber and an actuating end disposed outside of the cutting assembly chamber;

a carriage coupled to the drive shaft and configured to translate along the drive shaft between a retracted position and an extended position;

a first linear cutter coupled to and movable with the carriage;

a second linear cutter coupled to and movable with the carriage, the second linear cutter being spaced from the first linear cutter by a lateral width, wherein the carriage, first linear cutter, and second linear cutter define a cutter envelope sized pass through the isolation valve chamber of the isolation valve and the access chamber of the outer valve body; and a cutter actuator operably coupled to the first linear cutter and the second linear cutter;

wherein, when the carriage is in the retracted position, the first and second linear cutters are disposed within the cutting assembly chamber, and when the carriage is in the extended position, the first and second linear cutters project from the cutting assembly housing open end by a cutting distance sufficient to extend entirely through the existing pipe.

2. The valve kit of claim 1, in which the insertion valve assembly further includes an insertion valve body sized for insertion through the access chamber of the outer valve body first section, the insertion valve body comprising:

a valve guide portion configured to extend across the outer valve body chamber, the valve guide portion including a valve seat defining a flow orifice extending through the valve guide portion, wherein the valve seat is configured to sealingly engage with the insertion valve element when the insertion valve element is in the closed position; and an attachment portion sealingly coupled to the outer valve body first section.

3. The valve kit of claim 2, in which the insertion valve body has an insertion valve body width that is less than the lateral width between the first linear cutter and the second linear cutter.

4. The valve kit of claim 2, in which:

the attachment portion of the insertion valve body defines an insertion valve access chamber sized to receive the insertion valve element; and the insertion valve assembly further includes a check valve extending across the insertion valve access chamber and configured to have an open position when the insertion valve element is in the closed position, and to move to a closed position blocking the insertion valve access chamber when the insertion valve element moves from the closed position to the open position.

5. The valve kit of claim 4, in which the check valve comprises:

a check valve first section having a first end pivotably coupled to a first location of the attachment portion of the insertion valve body, and a second end;

a check valve second section having a first end pivotably coupled to a second location of the attachment portion of the insertion valve body, and a second end;

wherein each of the check valve first section and the check valve second section are biased toward closed positions, in which the second end of the check valve first section sealingly engages the second end of the check valve second section; and wherein each of the check valve first section and the check valve second section pivot toward open positions upon application of mechanical force.

6. The valve kit of claim 4, in which:

the check valve is biased toward the closed position;

mechanical engagement of the insertion valve element with the check valve as the insertion valve element moves to the closed position pushes the check valve to the open position; and removal of mechanical engagement of the insertion valve element from the check valve as the insertion valve element moves to the open position automatically moves the check valve to the closed position.

7. The valve kit of claim 1, in which the drive shaft has a drive shaft length such that the cutting distance by which the first and second linear cutters project from the cutting assembly housing open end is sufficient for the first and second linear cutters to pass through the isolation valve chamber of the isolation valve and the access chamber of the outer valve body in addition to extending entirely through the existing pipe.

8. The valve kit of claim 1, in which:

the existing pipe has a pipe diameter; and the lateral width between the first linear cutter and the second linear cutter is less than the pipe diameter.

9. The valve kit of claim 1, in which:

the outer valve body second section includes a raised seat portion; and the insertion valve element is configured to sealingly engage with the raised seat portion when the insertion valve element is in the closed position.

* * * * *